UNITED STATES PATENT OFFICE.

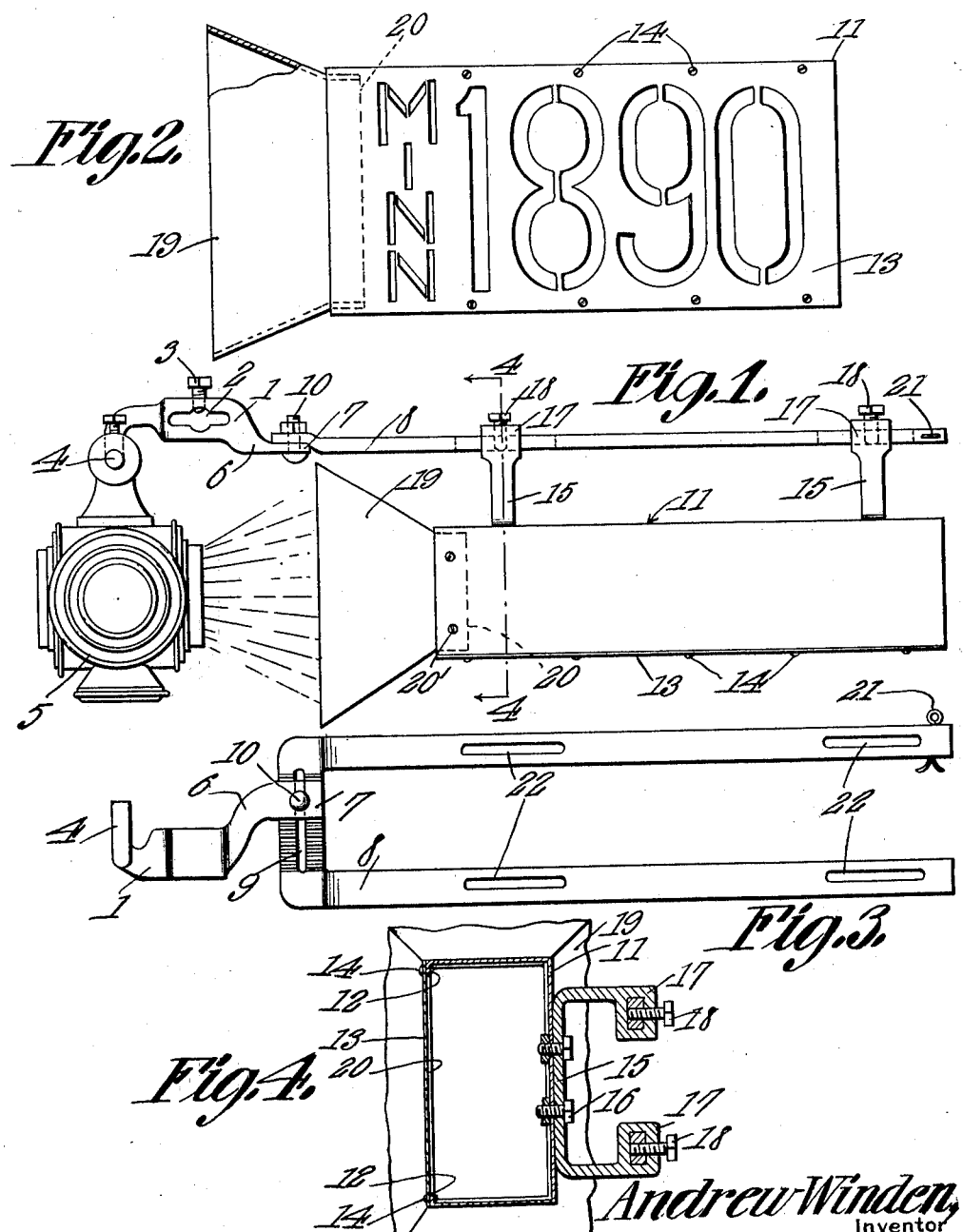

ANDREW WINDEN, OF MADELIA, MINNESOTA.

AUTOMOBILE LAMP AND LICENSE-PANEL HOLDER.

1,112,958.  Specification of Letters Patent.  Patented Oct. 6, 1914.

Application filed December 1, 1913. Serial No. 804,026.

*To all whom it may concern:*

Be it known that I, ANDREW WINDEN, a citizen of the United States, residing at Madelia, in the county of Watonwan and State of Minnesota, have invented a new and useful Automobile Lamp and License-Panel Holder, of which the following is a specification.

The present invention appertains to a holder for an automobile tail lamp and license panel, and aims to provide a novel and improved device of that character, whereby the license panel or tag may be conveniently and effectively illuminated by the tail lamp.

It is the object of the present invention to provide a holder of the nature indicated, which shall embody unique means for supporting the rear lantern or lamp of an automobile, as well as the license panel or tag, whereby the lamp and panel may be held in coöperative relation for the illumination of the panel during the night or darkness.

It is also the object of the present invention to provide a device of the character specified, which will be applicable to the ordinary lamp brackets or irons of automobiles or motor vehicles, which shall be so constructed as to hold a lamp and license panel for various adjustments relative to each other in order that the most effective illumination of the panel is attainable.

The invention also has for an object, to provide novel means for illuminating the license panel or tag by the light reflected from the tail lamp or lantern.

It is also within the spirit of the present invention, to provide an appliance of the class indicated, which shall be comparatively simple, and inexpensive in construction, as well as convenient, practical and efficient in its use.

With the foregoing and other objects in view, which will appear as the description proceeds, the invention resides in the combination and arrangement of parts and in the details of construction hereinafter described and claimed, it being understood that changes in the precise embodiment of the invention herein disclosed can be made within the scope of what is claimed without departing from the spirit of the invention.

The invention has been illustrated in its preferred embodiment in the accompanying drawing, wherein:—

Figure 1 is a plan view of the improved holder. Fig. 2 is a front view of the panel and its casing. Fig. 3 is an elevation of the holder with the license panel casing and lamp removed. Fig. 4 is a cross section taken on the line 4—4 of Fig. 1.

In carrying out the present invention, there is provided a bracket 1, having a combined slot and bore 2, which is engageable over the flat and circular standards of various lamp brackets or irons, commonly employed for supporting the tail lanterns or lights of automobiles. The bracket 1 carries a set screw or clamping member 3 for maintaining the bracket 1 in position when applied to the usual lamp bracket or iron of a motor vehicle, it being observed that the present bracket 1 is in the form of a supplemental bracket.

The bracket 1 is provided at one side with a rearwardly off set standard 4, to which the usual lantern or lamp 5 is attachable, it being understood that any form of lantern or lamp may be employed, such as an oil lantern, an electric lamp, or their equivalents. At its other side, the bracket 1 is provided with an upwardly and rearwardly projecting arm 6, terminating in a flat portion 7.

The supporting element for the panel or tag is in the form of a U-shaped member 8, having relatively long arms, and the yoke or intermediate portion of which is provided with a slot or elongated opening 9. The intermediate or yoke portion of the supporting element or carrier 8 rests against the flat portion 7 of the arm 6, a clamping bolt 10 being passed through the portion 7 and the slot 9 to clamp the supporting member 8 at various vertical positions within the limits of the slot 9. The intermediate or yoke portion of the supporting member 8, is preferably toothed or roughened, to assist in the proper support of the said member, when the clamping bolt 10 is tightened. The supporting member 8 is held in such a position that its arms project horizontally away from the lamp standard 4.

The license panel or tag casing 11 has its front side and one end open, the top and bottom of the casing 11 being provided with inturned flanges 12 along their front edges, to which flanges the license panel or tag 13 is attached by means of screws or other securing members 14. The license panel or tag 13, as well as the casing 11, are preferably constructed of sheet metal or other suitable opaque material, the license number being cut or punched out of the panel 13, to permit of the passage of light rays therethrough. It is apparent that various license panels may be applied to the casing 11, as may be necessary or desirable.

The casing 11 is supported from the member 8, by means of a pair of U-shaped brackets 15, which have their intermediate or yoke portions secured to the rear side of the casing 11, by means of bolts or other securing members 16, the arms of the brackets 15 projecting rearwardly and having the terminal eyes or loops 17 slidably engaging the respective arms of the supporting member 8, whereby the casing 11 may be adjusted horizontally to and from the lamp 5, the open end of the casing 11 being disposed adjacent the lamp. Set screws 18 are preferably carried by the eyes or loops 17 to clamp the brackets 15 in various adjusted positions.

In order to effectively direct or focus the light rays into the casing 11, a frusto-pyramidal reflector 19 is attached to the open end of the casing 11, the smallest end of the reflector 19 having the continuous flange 20 inserted into the open end of the casing 11, and maintained therein by screws or other securing members 20'.

A cotter pin or other stop 21 is preferably attached to the extremity of one arm of the supporting member 8, to ordinarily prevent the accidental detachment of the light casing 11 from the supporting member. The arms of the supporting member 8 may also be provided with slots 22 for the reception of screws 18, to permit of ready longitudinal adjustment of the casing 11, as may be desirable or essential.

In use, the several parts of the present device may be readily assembled and applied to the ordinary lamp bracket or iron of a motor vehicle, so that when the lamp or lantern 5 is attached to the standard 4, the light rays will enter the casing 11, to render the license number visible from the rear. The reflector 19 is of advantage inasmuch as it focuses or reflects the light into the light casing 11, whereby the intensity of the illumination will be increased appreciably. The light casing 11 may not only be adjusted longitudinally to and from the lamp, but may be adjusted vertically by adjusting the supporting member 8 relative to the arm 6, so that the most advantageous illumination of the license panel or tag, may be accomplished.

In view of the foregoing taken in connection with the drawing, the other advantages and capabilities of the present device will be apparent to those familiar with the art, it being noted that the objects aimed at have been carried out satisfactorily.

Having thus described the invention what is claimed as new is:—

1. In a device of the character described, a bracket having a lamp standard and arm, a U-shaped supporting member, a clamping member carried by the said arm, the yoke portion of the supporting member having a slot receiving the said clamping member, and a license panel adjustable upon the arms of the supporting member.

2. In a device of the character described, a bracket having a lamp standard, a U-shaped supporting member having its yoke portion adjustably connected to the bracket, U-shaped brackets having their terminals slidably engaging the arms of the said supporting member, and a license panel carried by the yoke portions of the said U-shaped brackets.

3. In a device of the character described, a bracket having a lamp standard, a supporting member attached to the bracket and projecting away from the said standard, a casing having one side attached to the supporting member, the other side and that end of the casing adjoining the said standard, being open, a license panel attached to the casing over the last mentioned side, and a light reflector having a flange secured within the open end of the casing.

4. In a device of the character described, a bracket having a lamp standard, a U-shaped supporting member having its yoke portion adjustably connected to the bracket, brackets slidably engaging the arms of the supporting member, a casing attached to the last mentioned brackets, that end of the casing adjacent the standard being open, a license panel carried by the casing, and adapted to be illuminated by light entering the open end of the casing and a light reflector carried by the open end of the casing.

In testimony that I claim the foregoing as my own, I have hereto affixed my signature in the presence of two witnesses.

ANDREW WINDEN.

Witnesses:
H. C. GUNDERSONS,
M. S. DOSSERT.

Copies of this patent may be obtained for five cents each, by addressing the "Commissioner of Patents, Washington, D. C."